Figure 1:
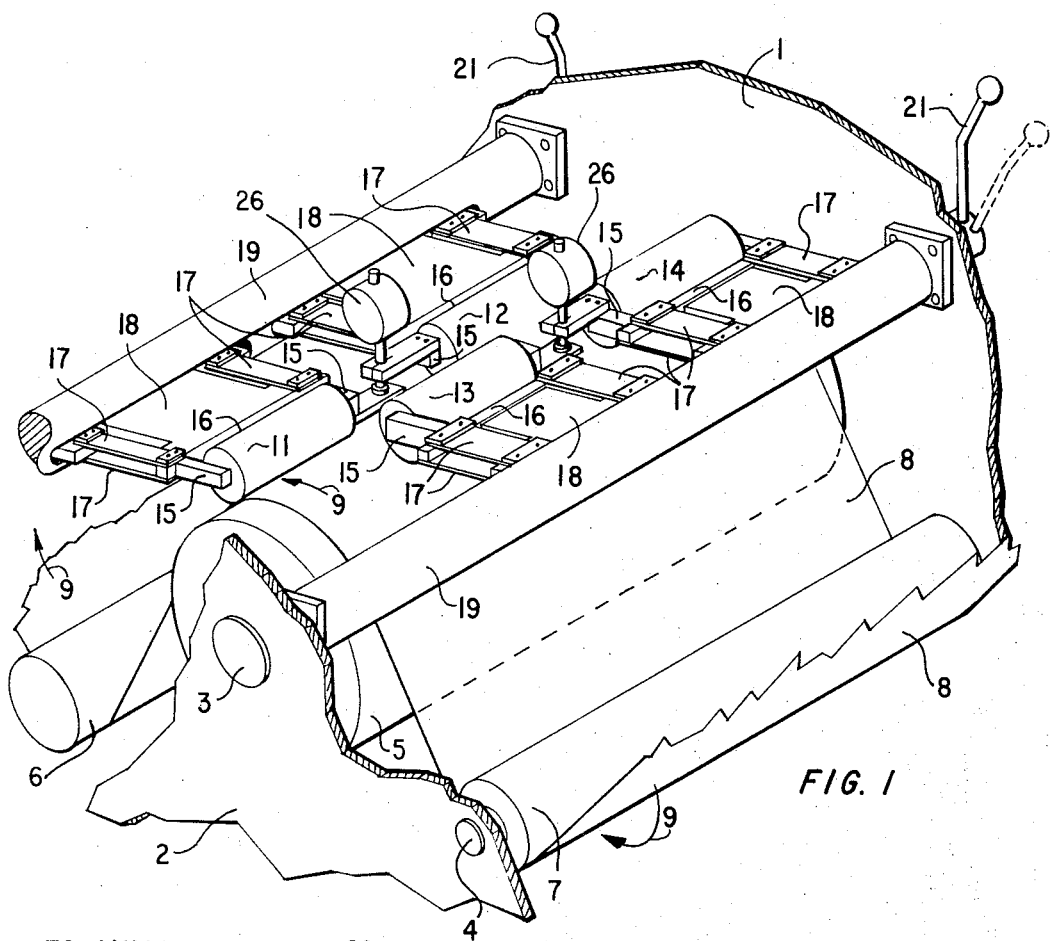

Jan. 16, 1968  E. J. SCHARF ET AL  3,363,458
APPARATUS FOR DETECTING SURFACE IMPERFECTIONS ON MOVING WEBS
Filed Feb. 11, 1966  2 Sheets-Sheet 1

INVENTORS
WILLIAM B. FINNEGAN
ERICH J. SCHARF
BY
ATTORNEY

INVENTOR
WILLIAM B. FINNEGAN
ERICH J. SCHARF
BY
ATTORNEY

3,363,458
APPARATUS FOR DETECTING SURFACE IMPERFECTIONS ON MOVING WEBS

Erich J. Scharf, Massapequa, and William B. Finnegan, Wantagh, N.Y., assignors to Cutler-Hammer, Inc., Milwaukee, Wis., a corporation of Delaware
Filed Feb. 11, 1966, Ser. No. 526,880
7 Claims. (Cl. 73—159)

This invention relates to the detection of raised surface defects in moving webs and is particularly directed toward the on-line inspection of paper where such defects are considered to be of damage causing potential.

In prior apparatus rolls and sliding blades have been used in conjunction with acceleration, displacement and sound responsive transducers to sense the passage of a defect. Although these devices are generally capable of detecting the defects referred to, they are subject to side effects which result from web speed, defect geometry, and dynamic problems caused by the behavior of the sensing elements at high web speeds so that the calibration of these devices cannot be achieved in terms which are clearly related to the extent of defect protrusion above the web being inspected.

It is therefore a primary object of this invention to provide apparatus for the detection of raised surface imperfections which will generate signals corresponding to the actual extent of defect protrusion above the web.

A further object of the invention is to generate signals independently of the geometry of the said defects, i.e. to generate an alarm or equivalent signal when the protrusion above the web of a defect exceeds a preset limit regardless of whether the defect is a lump, chip of metal, fold, or crease.

An additional object of the invention is to provide the construction of such apparatus in a modular form which essentially renders it immune from dynamic problems of large, fast machines and from the tolerance problems associated with the manufacture of high speed web driving elements of large face or width.

According to the present invention, a plurality of sensing members are arranged to monitor respective different portions of the width of the moving web independently of each other, so a localized irregularity such as a lump traversing the sensing region of one of the sensing members will actuate only that sensing member. Each sensing member is associated with another one that covers a nearby or adjacent part of the web, to form a pair. A differential transducer is coupled to each pair so as to provide an output signal when the sensing members of the pair are actuated in unlike manner (for example when one is actuated and the other is not) but no output signal when both sensing members are actuated alike.

The differential sensing arrangement discriminates against unwanted responses to machine vibration, eccentricities of web support rolls, and variations in the overall thickness or "caliper" of the web. Such relatively large-area effects are unavoidably present in any high speed mill environment, and in prior art systems tend to mask the detection of small localized irregularities.

In a presently preferred embodiment of the invention, independently suspended feeler devices are arranged to ride in positive contact with the web as it passes over a backing roll or surface. Position sensitive transducers are coupled between adjacent feeler devices to indicate any relative vertical displacement between them.

The feelers are suspended for translatory motion in substantially a single degree of freedom, and are provided with mechanical damping to make the feeler motion approximate the defect contour, or be predictably related to it.

Figure 2:
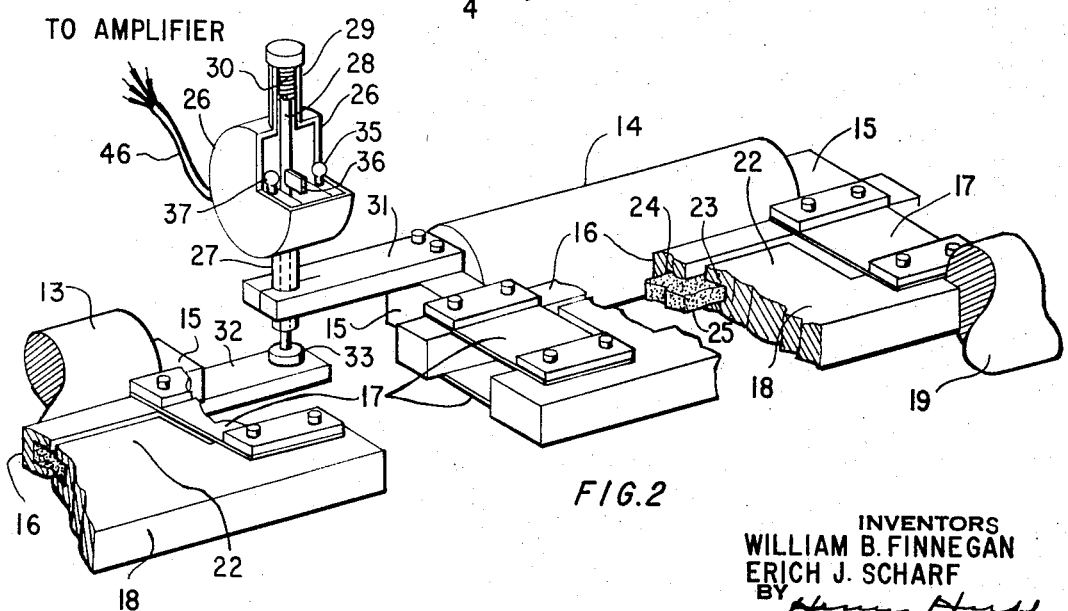
Figure 3:
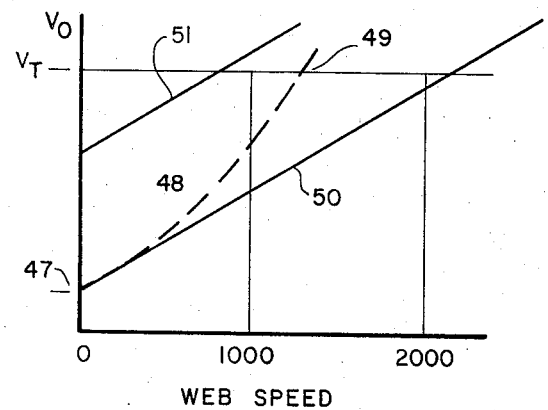
Figure 4:
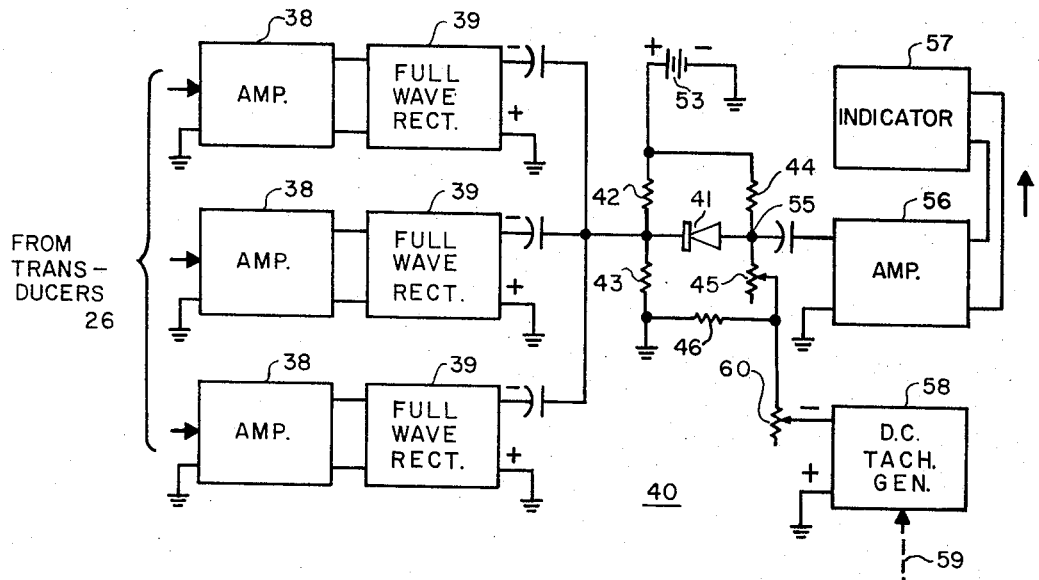

The invention will be described with reference to the accompanying drawings, wherein:

FIGURE 1 is a perspective view of the mechanism of a presently preferred embodiment, with portions broken away to expose certain details, FIGURE 2 is a perspective view of a part of the structure of FIG. 1 drawn to a larger scale to show the feeler suspension and differential, displacement sensing means in more detail, FIGURE 3 is a group of graphs illustrating certain operating characteristics of the system, and FIGURE 4 is a schematic diagram illustrating means for processing and utilizing electrical signals produced by the displacement sensing means.

Referring to FIG. 1, a pair of parallel plate members 1 and 2 carry bearings 3, 4 and others not visible in the drawing, rotatably supporting a back-up roll 5 and a pair of hold-down rolls 6 and 7 arranged to guide a moving web 8 of sheet material such as paper passing under rolls 6 and 7 and over roll 5. The plates 1 and 2 are secured to a base member, not shown, and the entire assembly is adapted to be placed between other mechanisms, not shown, which are parts of a processing or production line of a known type such as is used in manufacturing, finishing, or converting paper. In the normal operation of the line, the web 8 is drawn past rollers 5, 6 and 7 as indicated by the arrows 9.

A plurality of feeler rolls 11, 12, 13 and 14 are disposed near the top of the back-up roll 5 in contact with the surface of the web 8. Each feeler roll is short compared to the width of the web, and engages the web in a respective sensing region extending laterally over a corresponding portion of the web. The feeler rolls are arranged in two groups, each group consisting of one or more pairs of rolls disposed in end-to-end alignment.

As shown in FIG. 1, rolls 11 and 12 form one group, rolls 13 and 14 form the other. For clarity of illustration, each group is shown as including only one pair of rolls; in practice, the number of pairs is made sufficient to accommodate the entire width of the web. The rolls 11, 12 of one group are staggered laterally of the web with respect to the rolls 13, 14 of the other group so that substantially every point on the web will pass through at least one, and preferably only one sensing region.

Each feeler roll is rotatably supported as by bearing assemblies in arms 15 extending from a respective yoke member 16. The yokes 16 are connected by parallel leaf springs 17 to blocks 18 fixed to supporting bars 19, which extend between the plates 1 and 2, parallel to the roll axes. The bars 19 are rotatable by means of handles 21 to lift the feeler rolls away from the back-up roll to facilitate threading the web, cleaning the rolls and inspection.

Referring to FIG. 2, the blocks 18 each include a portion 22 that extends between the associated pairs of leaf springs 17 toward the base of the respective yoke member 16. The portion 22 and yoke member 16 are provided with facing juxtaposed slots 23 and 24 extending parallel to the axis of the adjacent feeler roll. A slab 25 of damping material substantially fills both slots 23 and 24 and extends between them, connecting the yoke 16 and block portion 22. The damping material may be any suitable known substance that exhibits substantially viscous resistance to deformation, i.e. opposes a change in shape with a force proportional to the speed of the change. Various elastomers, for example certain silicones, have this characteristic. The dimensions of the slab 25 are determined by the particular material used, the stiffness and preset of the springs 17, and the mass of the feeler roll, to control "overshoot" of the feeler rolls at the web speeds typically encountered in mill operation, as will be explained below.

The described spring suspension of the feeler rolls restricts their translatory motion to substantially a single degree of freedom, perpendicular to the surface of the web in the respective contact region. Relative or differential movement between the two feelers of a pair, such as rolls 13 and 14, is sensed by a displacement responsive transducer 26. As shown in FIG. 2, the transducer 26 includes a rod 28 mounted for longitudinally sliding movement in bearings 27 and 29 at the top and bottom of the transducer housing. The lower bearing 27 is secured to a bracket 31 extending from one arm 15 of the yoke 16 that supports the feeler roll 14. The lower end of the rod 28 is secured to a bracket 32 extending from the adjacent arm 15 of the yoke 16 associated with feeler roll 13.

A lamp 35 and a photocell 37 are disposed within and supported by the transducer housing, on opposite sides of an opaque vane 36 extending laterally from the rod 28. The relative positions of the parts are adjusted so that the vane 36 partially obscures the path between the lamp 35 and the photocell 37 when the feeler rolls 13 and 14 are in coaxial alignment with each other, i.e. when their relative displacement is zero. When feeler roll 13 is moved upward with respect to roll 14, vane 36 moves upward with respect to lamp 35 and photocell 37, reducing the amount of light reaching the photocell. When roll 14 is moved upward with respect to roll 13, the amount of light reaching the photocell is increased. When both rolls 13 and 14 move the same distance up or down, the amount of light remains unchanged. The electrical output of the photocell 37 is directly related to the relative displacement of the feeler rolls, increasing from its zero-displacement value when the relative displacement is in one sense and decreasing from said value when the relative displacement is in the opposite sense.

In the operation of the systems as thus far described, a lump or similar local irregularity in the web 9 passing under one of the feeler rolls will displace that roll upward, causing the associated transducer 26 to produce an electrical output in the form of a brief pulse. The pulse may be positive going or negative going, depending upon which feeler roll is actuated.

As the lump engages the roll, it imparts to the roll a vertical velocity (perpendicular to the web surface) that depends upon the web speed, i.e. the velocity with which the web is drawn through the machine. Vertical motion of the feeler roll is opposed by the forces of gravitation, springs 17, and the viscous damping provided by slab 25. The springs 17 are preferably designed to contribute as little force as possible, consistent with their functions of supporting the feeler roll and restricting its motion to one degree of freedom.

With this and other simplifying assumptions, such as that the lump is in the form of a step function, and does not deform under the feeler roll, it can be shown that theoretically, and without the viscous damping, the roll will rise above the base or prevailing surface of the web by a distance proportional to the square of the web speed. If the web speed were kept low enough, the feeler roll would rise only by an amount equal to the height of the lump, and remain in contact with the lump throughout its passage under the roll. In practice, as in paper inspection, it is desirable to detect all lumps higher than say 0.003 inch, at web speeds that may vary from 1000 to 2000 feet per minute. With these conditions and typical roll diameters, the feelers will "overshoot" i.e. rise higher than, and out of contact with, some or all of the lumps they encounter.

FIG. 3 shows the effects of web speed on the response of the system, with damping and without damping. $V_o$ is the amplitude of the output of a photocell 37. When $V_o$ exceeds a reference level $V_T$, a lump is indicated. When $V_o$ is less than $V_T$, no indication occurs. Apparatus for this purpose will be described later with reference to FIG. 4. At near zero web speed, the feeler roll will rise only by the height of the lump, and $V_o$ will be a direct measure of the height. Point 47 on the ordinate of FIG. 3 represents this value of $V_o$ for a lump say 0.0025 inch high, slightly less than the minimum height desired to be detected.

At higher web speed, $V_o$ is larger for a given lump. In the absence of damping, $V_o$ is proportional to the square of the web speed, as indicated by the dash line curve 48. In a typical case, $V_o$ will exceed $V_T$ somewhere within the desired operating web speed, as at point 49, causing an indication although the lump is not supposed to be detected.

With viscous damping of the feeler roll, the overshoot is substantially proportional to the web speed instead of its square. The line 50 in FIG. 3 represents $V_o$ as a function of web speed in response to a 0.0025 inch lump, with sufficient damping to prevent $V_o$ from exceeding $V_T$ within the operating speed range of 1000 to 2000 feet per minute.

The slope of line 50 depends upon the amount of damping, i.e. the resistance force per unit of vertical velocity of the sensing roll, which is determined by the dimensions of the slab 25 and its viscosity.

As a practical matter, the amount of damping should not be much more than that required to prevent false indications of undersize lumps, in order to avoid excessive forces and possible damage to the web when a larger lump occurs. In a typical design, using a feeler roller 2 inches in diameter and weighing 3 pounds, the peak damping force is of the order of 30 pounds when a lump 0.003 inch high passes under the roller at a web speed of 1000 feet per minute. The slab 25 may be about 5 inches long, ¾ inch thick, and provide an active shear space between the parts 16 and 22 of FIG. 2 about 1/64 inch wide. The slab material typically has a viscosity of about 100,000 centipoises. Material of different viscosity may be utilized by changing the dimensions of the slab as required.

Returning to FIG. 3, the line 51 represents $V_o$ as a function of web speed for a lump somewhat higher than 0.003 inch, with the same damping as in the case of line 50. In this case $V_o$ exceeds $V_T$ throughout the web speed operating range. The maximum value of $V_o$ in excess of $V_T$ will be limited by the displacement range of the transducer 26 or the mechanical limit stop effect of the damping slabs, or both. It should be apparent without illustration that other mechanical stop means could be provided to limit overshoot of the feeler rolls, if desired.

Referring to FIG. 4, the outputs of the transducers 26 are conducted to respective amplifiers 38, which serve to electrically isolate the transducers from each other. The amplified transducer output signals are applied to respective full wave rectifiers 39. As mentioned above, the transducer outputs may be either positive going or negative going, depending upon which feeler roll of a pair is actuated. The rectifiers 39 provide outputs that are negative going with respect to ground potential, regardless of the polarity of the transducer signals from which they are produced.

The outputs of the rectifiers 39 are coupled as indicated to a level sensing circuit 40, which comprises a unidirectionally conductive diode 41, resistors 42, 43, 44, 45 and 46, and a D-C source 53. The diode 41 is poled to be conductive from right to left as shown in the drawing. The resistors 42 through 46 form a Wheatstone bridge energized by the source 53, and unbalanced to supply a back bias, i.e. a bias voltage opposing conduction, to the diode 41.

The back bias level is set, by adjusting the resistor 45, to make the reference level $V_T$ (see FIG. 3) correspond to the minimum size lump to be indicated. When any transducer 26 produces an output $V_o$ which, after amplification in amplifier 38 and rectification in full wave rectifier 39, exceeds the back bias on diode 41, the diode conducts, providing a negative going signal at point 55. The latter signal is amplified by an amplifier 56 to energize an indicator device 57 such as an alarm or a recorder.

The described system will operate satisfactorily throughout a wide range of web speeds and web material characteristics without false indications due to overshoot or machine vibrations. In some cases, however, it may be desirable to provide web speed compensation instead of relying entirely on viscous damping.

Electrical compensation for web speed variation may be provided by increasing the back bias on the level sensing diode 41 with increase in web speed. For this purpose, a direct current tachometer generator 58 is mechanically coupled, as schematically indicated by dash line 59, to an appropriate element of the roll drive mechanism operating at a speed equal or proportional to the web speed. The negative output terminal of the tachometer generator is connected through an adjustable resistor 60 to the junction of resistors 45 and 46 in the level sensor circuit.

The voltage output of the tachometer generator is proportional to the web speed, and a portion of it is additively superimposed on the back bias derived from the source 53. The effect of this additional bias is to reduce the slope of the response speed characteristic by an amount depending upon the adjustment of resistor 60, without requiring a corresponding increase in viscous damping of the feeler members.

We claim:
1. An in-process inspection system for detecting localized irregularities in thickness of a moving web of sheet material, comprising
   (a) a plurality of web surface sensing members, each having a sensing region that extends transversely of the web over a respective different portion of the width of the web,
   (b) each of said sensing members being actuable by surface height variations only in the portion of the web moving past the respective sensing region, substantially independently of the lateral position of such variation within said sensing region,
   (c) a plurality of differential transducer means, each coupled to a respective pair of neighboring sensing members and responsive substantially only to unlike actuation of the sensing members of said respective pair to provide an output signal, and
   (d) means responsive to such output signal to indicate an irregularity.

2. The invention set forth in claim 1, wherein said web surface sensing members are feeler devices and said sensing regions are contact areas thereon, further including means supporting said feeler devices for actuation independently of each other in translatory motion substantially perpendicular to the surface of the web.

3. The invention set forth in claim 2, wherein said means supporting said feeler devices comprises leaf springs disposed in parallel pairs to restrict the translatory motion of each contact area to substantially a single degree of freedom.

4. The invention set forth in claim 3, further including means providing substantially viscous damping of translatory motion of said feeler devices.

5. The invention set forth in claim 2, wherein the means for sensing translatory motion of one contact area with respect to another is a differential transducer comprising two relatively movable elements each coupled to one of said feeler devices.

6. The invention set forth in claim 1, wherein said means responsive to said output signal includes a threshold device, means for applying a bias to said threshold device to prevent an indication unless said output signal attains a magnitude exceeding said bias, and means for adjusting said bias in accordance with the minimum surface height variation to be detected.

7. The invention set forth in claim 6, further including means for varying said bias in accordance with the speed of the web to compensate for variations in the actuation of said sensing members caused by variation in the speed of the web.

References Cited
UNITED STATES PATENTS

| | | | |
|---|---|---|---|
| 2,523,184 | 9/1950 | Beall | 340—259 |
| 3,037,381 | 6/1962 | Grant et al. | 73—159 |

LOUIS R. PRINCE, *Primary Examiner.*
J. NOLTON, *Assistant Examiner.*